Nov. 29, 1960     R. J. HUSBAND     2,962,610
REPEAT CYCLE TIMER
Filed Feb. 8, 1960
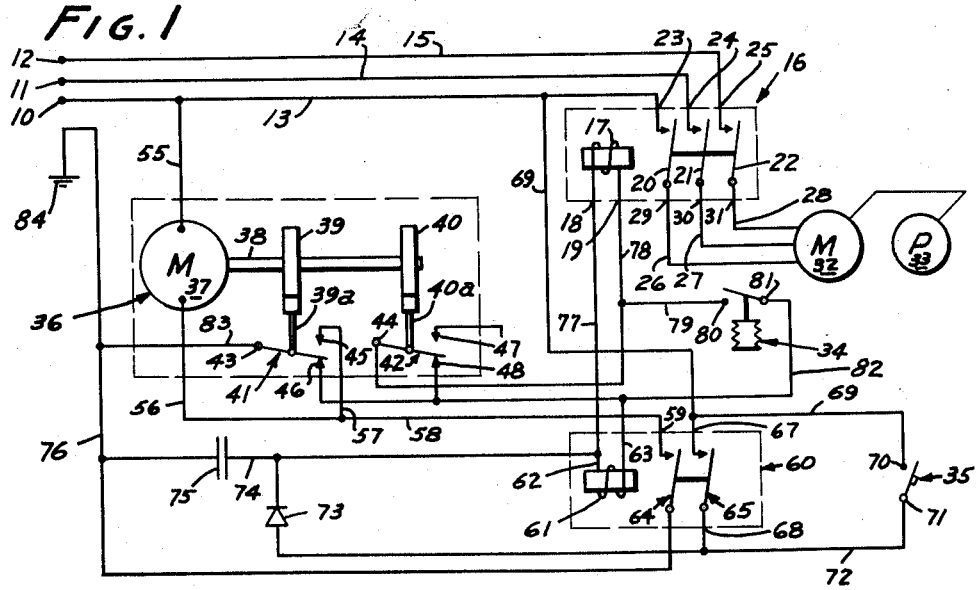
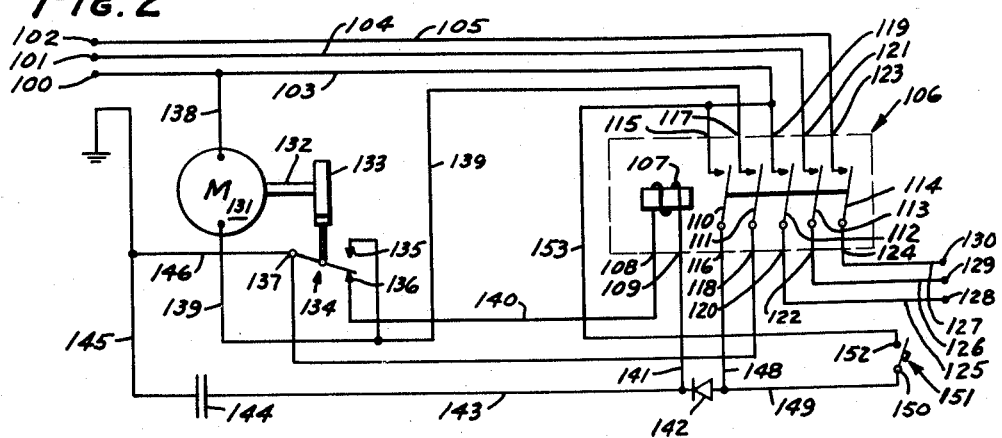
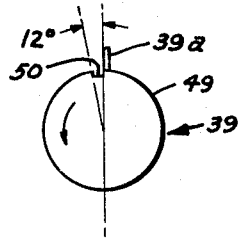
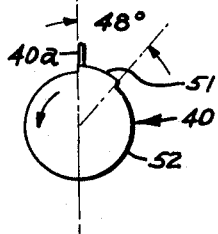
INVENTOR.
REED J. HUSBAND
BY Angus & Mon
ATTORNEYS United States Patent Office 2,962,610
Patented Nov. 29, 1960

2,962,610

REPEAT CYCLE TIMER

Reed J. Husband, 650 Carroll Way, Pasadena, Calif.

Filed Feb. 8, 1960, Ser. No. 7,252

13 Claims. (Cl. 307—141.4)

This invention relates to a repeat cycle timer.

It is an object of this invention to provide a repeat cycle timer which is adaptable to energize or otherwise control one or many circuits simultaneously, and maintain them in such a condition for a predetermined period of time, whereupon it returns to a repose condition until a subsequent actuation. Such a timer has many uses, one example being the control of motor-driven pumps for flushing airborne toilet installations.

It is another object of this invention to provide such a device wherein the cycle's period is maintained to a close tolerance, and which device has a long service life of dependable operation.

This invention is carried out in combination with a source of current which serves to operate the timer and which may also power the devices whose operation is to be controlled by the timer. According to the invention, a timer motor drives a cam, movement of the cam through a cycle serving to define the period during which a circuit is to be energized by the timer. The timer motor is connected to the source of power, and a cam-actuated switch and a captive circuit serve to alternately connect the timer motor to a ground for operating the same. The captive circuit is actuated by a starter switch to start the operation, and the cam-actuated switch operates to continue timer motor operation after the captive circuit is opened near the end of a cycle.

According to a preferred but optional feature of the invention, a second cam-driven switch, together with a condition-responsive switch, (such as a bellows-type pressure switch), are provided to cut off power to the device being controlled in the event that some desired condition, such as pressure, is not developed by the device within a predetermined length of time.

The above and other features of this invention will be fully understood from the following detailed description and the accompanying drawings, in which:

Fig. 1 is a layout of the presently preferred embodiment of the invention;

Fig. 2 is a layout of an alternate embodiment of the invention; and

Figs. 3 and 4 are plan views of a pair of cams utilized in Fig. 1.

Initial reference will be made to Fig. 1, in which three terminals 10, 11, 12 are shown. These comprise a source of electric current. For airborne installation, this will commonly be 400 cycle three-phase alternating current. The device will be shown connecting the three phases to a single three-phase motor. It will be understood that the device as shown could be utilized to supply single-phase current to a plurality of motors, or, if desired, by modifying the number of circuits involved, control more or fewer single or multi-phase motor or other devices. Leads 13, 14, 15 are respectively connected to terminals 10–12.

A relay 16 includes a coil 17 that has a pair of terminals 18, 19, the coil serving to control switches 20, 21, 22 which are ganged for simultaneous operation. The normal, unactuated condition of the relay is indicated with switches 20–22 in their open position. Energizing coil 17 closes these switches. Leads 13, 14, 15 are connected to first terminals 23, 24, 25 of switches 20–22, whole leads 26, 27, 28 are connected to second terminals 29, 30, 31 of the switches, and are themselves connected to a three-phase motor 32. Motor 32 is coupled to a pump 33. The discharge side of the pump (not shown) is connected to a bellows (aneroid) switch 34 which is open at low pressures and which closes at some predetermined pressure.

The object of the illustrated installation is to close switches 20–22 for a predetermined period of time so as to operate pump 33 when a starter switch, such as switch 35 (a normally open push-button type switch), is momentarily closed.

A motor-driven assembly 36 includes a timer motor 37, which is a synchronous motor, and which drives a cam shaft 38. The shaft mounts cams 39, 40 whose positions relative to cam followers 39a, 40a, respectively, are shown in Figs. 3 and 4, respectively. Cam-actuated switches 41 and 42 are operated by the cam followers. Each switch has a common terminal 43, 44, and two switch terminals 45, 46 and 47, 48, respectively. The switches are shown in their actuated conditions. When released by the cams, their blades make respective contact with terminals 45 and 47, instead of with terminals 46 and 48.

Cam 39 has a rise portion 49 and a depressed portion 50. Cam 40 has a rise portion 51 and a depressed portion 52.

Lead 55 connects motor 37 to a source of power through lead 13. Lead 56 acts as a motor ground line. It has a branch 57 which connects to terminal 45 of switch 41. It has another branch 58 that connects to terminal 59 of captive relay 60.

Captive relay 60 includes a coil 61 having a pair of terminals 62, 63 and a pair of ganged switches 64, 65. These switches have terminals 59, 66, and 67, 68, respectively. These switches are open when the coil is not energized, and closed when it is energized.

Lead 69 connects terminal 67 in relay 60 and lead 13. It also connects lead 13 to a first terminal 70 of starter switch 35. Terminal 71 of switch 35 is connected by lead 72 to terminal 68 of switch 65 and also to one side of a diode 73. The other side of the diode is connected by lead 74 to one side of a capacitor 75 and also to terminal 62 of coil 61. Terminals 66 and 68 are thereby connected to terminals 62 and 18.

The other side of the capacitor is connected to ground lead 76. Lead 77 interconnects the first terminal of the coil in captive relay 60 to the first terminal 18 of the coil in relay 16. Lead 78 connects second terminal 19 of the coil in relay 16 to common terminal 44 of switch 42, and also through branch 79 to terminal 80 of aneroid switch 34. Terminal 81 of the aneroid switch is connected by lead 82 to second terminal 63 of the coil in captive relay 60, to terminal 48 of switch 42, and to terminal 46 of switch 41. Lead 83 connects terminal 43 of switch 41 to ground lead 76 which is grounded at 84.

The embodiment of Fig. 2 utilizes only one relay, and one cam-actuated switch, instead of two of each. The operational distinction between the two embodiments is that the system of Fig. 2 does not include a captive shut-off device to act as a safety device.

Terminals 100, 101 and 102 are the current source for the device. These respectively connect to leads 103, 104 and 105. A relay 106 includes a coil 107 having terminals 108, 109. The coil actuates five normally open switches 110, 111, 112, 113 and 114 which are ganged for simultaneous actuation. These switches respectively have terminals 115, 116; 117, 118; 119, 120; 121, 122; and 123, 124. Leads 103, 104 and 105 are respectively connected to terminals 119, 121 and 123. When the coil is energized, the switches are closed; when the coil is unactuated, the switches are open.

Switch terminals 120, 122, and 124 are respectively connected to leads 125, 126, and 127 and thence to terminals 128, 129, and 130, respectively. The motor or other device under the control of this timer may be connected at these terminals.

A synchronous timer motor 131 drives a cam shaft 132 which carries a cam 133 identical to cam 39, and whose physical relationship to a cam-actuated switch 134 is identical to the relationship between cam 39 and switch 41 in Figs. 1 and 3. Cam-actuated switch 134 has terminals 135 and 136, and a common terminal 137. The switch is biased to be closed on terminal 135, and assumes that position when the depression portion of the cam is in contact with the cam follower. The position illustrated shows the switch actuated by the cam, the rise portion thereof being in contact with the follower.

Timer motor 131 is connected by lead 138 to lead 103 for a source of current. Its other side is connected by lead 139 to terminal 135 of switch 134, and to terminal 117 of switch 111 in the relay.

Terminal 136 of cam-actuated switch 134 is connected by lead 140 to terminal 108 of the relay's coil. Terminal 109 of the coil is connected by lead 141 to one side of a diode 142 and by lead 143 to one side of a capacitor 144, the other side of which is connected to ground lead 145. Lead 146 connects common terminal 137 of cam-actuated switch 134 to the ground lead. Terminals 150 and 116 are thereby connected by leads 148, 149 and 141 to terminal 109.

The other side of the diode is connected by lead 148 to terminal 116 of switch 110, and by lead 149 to terminal 150 of a starter switch 151. This switch is a normally open pushbutton type. Terminal 152 of the starter switch is connected by lead 153 to terminal 115 of switch 110, and to lead 103 for a source of current.

The term "ground" as used herein, such as at 84 and 145, signifies a connection to a point where a potential difference exists between it and the current source, and is not to be limited to the narrow sense of an aircraft frame. The term is intended to be sufficiently broad to cover, for example, such well-recognized "grounds" as the neutral point in a 3-phase, star connected circuit. The term "current source" is not to be limited to comprehend only a source of alternating current, but is used in its broadest sense of source of electrical potential relative to ground, and also comprehends a source of direct current.

The operation of the embodiment of Fig. 1 will now be described. At the start of the cycle, that is, at the repose condition of the circuit, the cam followers are disposed relative to the cams as shown in Figs. 3 and 4; that is, both of them are on the initial edges of the rise portions of the cams. (The cams of Figs. 3 and 4 are inverted relative to their position illustrated in Fig. 1.) The cams illustrated were designed to provide for a 15-second cycle wherein the timer motor 37 makes one revolution per 15 seconds, and motor 32 is operated for 14½ of these seconds. The depression portion of cam 39 is 12°, which changes the position of its respective switch for ½ second. The included angle of the rise portion of cam 40 is 48°, which will keep its switch actuated as shown for 2 seconds, after which it switches over for 13 seconds.

The accuracy of the cycle is a direct function of the accuracy of the frequency of current provided to lead 13, because the cycle's period is entirely governed by the speed of the timer motor. Should the frequency vary from the designed-for frequency, then of course an error will be introduced in the period of the cycle.

At any rate, when starter switch is at least momentarily closed, and current is supplied to terminals 10–12, a circuit is made from terminal 10 through leads 13 and 69, to and through the starter switch, lead 72 and diode 73 (which rectifies the current and provides pulsating D.C. current), lead 74, and thence to the coils of both relays.

In relay 16, current flows through coil 17 from terminals 18 and 19, thence through lead 78, through switch 42 which is held in the position shown to make connection between its terminals 44 and 48 while the rise portion of cam 40 contacts the cam follower (the initial part of the cycle), thence to terminal 46 of switch 41. Because switch 41 is held in the position shown while the rise portion of cam 39 contacts the cam follower (the initial part of the cycle), a connection is made between terminals 43 and 46, and from terminal 43 to ground lead 76 and ground 84. This makes a complete circuit for the coil of relay 16, which closes switches 20, 21, and 22 to start motor 32.

Lead 74 has current on it so long as the starter switch is held closed. However, means must be provided to keep the current on after the starter switch is opened. Also, means must be provided to start the timer motor, and to keep it in operation. This is accomplished by captive circuitry. When the starter switch is closed, current is provided to terminal 62 of coil 61 in relay 60. This current flows from terminal 63 to terminal 46, to common terminal 43 of switch 41, and thence to ground lead 76 and ground 84. This completed circuit energizes coil 61, and thereby closes switches 64 and 65 so that lead 69 is connected through terminals 67 and 68 to lead 72, thereby shunting out the starter switch. Now switch 65 is held captive, and coil 61 remains energized even after the starter switch is opened.

Furthermore, as soon as relay 60 is actuated, a circuit is made for the timer motor to operate. This may be traced out as follows: Lead 55 provides current to the motor, and lead 56 is connected to ground through terminals 59 and 66 of closed switch 64, terminal 66 being connected to ground lead 76. Thus, so long as relay 60 remains actuated, timer motor 37 will continue in operation.

As the motor continues to operate, the cam follower associated with cam 40 will reach the end of rise portion 51, and will move into depression portion 52. At that time, the condition of switch 42 will change over. This disconnects terminals 19 of coil 17 from ground by opening the connection between common terminal 44 and terminal 48 of switch 42. Unless an alternate circuit were provided, relay 16 would become deactuated, switches 23–25 would thereby be opened, and motor 32 would be stopped. This is the safety feature of the invention. For example, were pump 33 to be run dry for more than about 2 seconds, it would tear itself up. Thus, the alternate means for keeping relay 16 actuated is condition-responsive; in this case, the condition is pressure. The way the device is kept in operation is by means of a circuit controlled by aneroid switch 34. When pump 33 is in operation, if it properly raises its outlet pressure, then the aneroid switch 34 will close, thereby connecting terminal 19 through leads 78, 79, and 82 to terminal 46, bypassing switch 42. Switch 41 is still held in the illustrated position by the rise portion of cam 39, and continues to be until near the end of the cycle, thereby providing a ground for coils 17 and 62, and maintaining switches 23–25 in their closed position so that the motor and pump continue to operate. If at any time during this portion of the cycle the pressure should fail, the aneroid would open and motor 32 would be stopped, because switches 20–22 will be opened.

Regardless of whether or not relay 16 is actuated, the ground will continue to be made for the timer motor through switch 64 until relay 60 is de-energized. Because switch 65 is part of a captive circuit, means are provided for breaking the same. These means comprise depression 50 on cam 39. When this depression reaches the cam follower, the cam follower permits switch 41 to switch over to interconnect the common terminal 43 to terminal 45. This continues the motor's ground circuit from lead 56, through lead 57, through switch 41, and lead 83 to the ground. However, it opens the circuit between common terminal 43 and terminal 46. This breaks the connection between terminal 63 of coil 61 and ground which formerly was made between those terminals. Thus, coil 61 is de-energized, and switches 64 and 65 are opened, thereby breaking the captive circuit.

The opening of switches 64 and 65 also serves to break the supply of current from lead 74 through switch 65 to the diode, thus de-energizing relay 16, opening switches 20–22, and stopping the pump.

When switch 64 opened, the ground circuit for the timer motor from lead 56 through switch 63 to ground lead 76 was opened. However, as stated, the timer motor ground was simultaneously switched from passage through lead 63 to passage through switch 41, so that the timer motor continues in uninterrupted operation. The timer motor continues to operate until the cam followers again reach the rises on their respective cams. At this time, a switch 41 is switched back again so that connection is made between common terminal 43 and terminal 46. This breaks the ground circuit which immediately before existed between terminals 43 and 45. However, at this time, there is no alternate circuit through switch 64 because relay 60 is not actuated. Switching switch 42 back to make contact between common terminal 44 and terminal 48 similarly has no effect on any circuit, because there is no current available to the relays until switch 65 is again closed. Therefore, as soon as switches 41 and 42 return to their illustrated conditions, timer motor 37 is shut off and will remain shut off, and all relays are de-energized, until the starter switch is again pressed. Note that the repose condition is power-off in all components of the circuit.

The operation of the embodiment of Fig. 2 will now be described. It is substantially the same as that of Fig. 1, except that there is no condition-responsive safety feature. In order to start the timer circuit in operation from the illustrated repose condition, starter switch 151 is closed, which draws current from lead 103, through lead 153, through the starter switch, to diode 142, and thence to ground 147. This energizes coil 107 and actuates the relay. This actuation closes switches 110–114. When switch 110 closes, current flows from lead 153 through switch 110, through captive lead 148, to diode 142 so that the coil of relay 106 remains captive and energized after starter switch 151 is opened.

When relay 106 is actuated, switch 111 is closed, thereby providing a circuit through the motor from lead 103, through lead 138, through the motor to lead 139, switch 111 and lead 153 to common terminal 137 of switch 134, and thence to ground 147. The timer motor will thus continue to operate so long as the relay is closed. Switches 112–114, when closed, provide current to terminals 128–130, respectively to which a motor-pump combination such as 32 and 33 of Fig. 1 could be connected for timed actuation.

The timer motor continues to operate until the depression portion reaches the cam follower, at which time the switchblade switches over to connect common terminal 137 with terminal 135. This breaks the circuit through coil 107, and opens switches 110–114, thereby cutting off current to terminals 128–130. However, the timer motor will still operate because of the connection made from lead 139 to terminal 135, thence to common terminal 137 to ground 147. When the cam follower again reaches the rise portion of the cam, the switch is restored to the illustrated position which breaks the ground circuit between terminals 135 and 137, restoring a connection between terminals 136 and 137. However, there is no ground connection through switch 111 because relay 106 is unactuated, and it will not become actuated until the starter switch is again closed. The timer is thus in its repose condition. The scheme of the embodiment of Fig. 2 is that, once the starter switch is closed, relay 106 is actuated and switches 110–114 are closed while the rise portion of cam 133 is in contact with the cam follower. When the depression portion engages the cam follower, switches 110–114 are opened, but the timer motor will continue to finish its full revolution.

The cams illustrated are single-cycle cams, and are the preferred type for use in this invention. However, merely by appropriately supplying gearing, different cam configurations could be provided for which might require more or less than one revolution of the cam per operation of the device. It is therefore to be understood that variations in the particular structure shown may be made without departing from the scope of the invention.

The device has the advantage that at repose none of its components are powered. It has the further advantage that the starter switch is ineffective on the cycle once the cycle has been started. Thus, the one manipulative part is rendered ineffective on the device as an entirety after the device is started, which avoids any jamming by the user.

This timer circuit is simple in operation and quite reliable. Its reliability as to elapsed time may be made as close as desired simply by governing the frequency of the input current and by careful machining of cams and maintenance of tolerances in the motor, cam, and switch assemblies. However, an inexpensive device has been made which has accuracy of ±5%, and which has shown remarkable reliability and durability in operation.

This invention is not to be limited by the embodiments shown in the drawings and described in the description which are given by way of example and not of limitation, but only in accordance with the scope of the appended claims.

I claim:

1. A repeat cycle timer for controlling a circuit comprising: a current source and a ground; a timer motor, a first terminal of which is connected to the current source; a cam driven by the timer motor; a cam-actuated switch engaged to said cam and having a pair of switching conditions determined by the cam, said switch including a common terminal connected to said ground and two switch terminals, and being adapted to connect the common terminal to either one of the switch terminals in response to the cam position; an electromagnetic relay including a coil having a pair of terminals, and three off-on relay switches connected for simultaneous actuation by the coil, a first of said relay switches interconnecting said current source and one terminal of the coil, a second of said relay switches interconnecting the common terminal of the cam-actuated switch and the second terminal of the timer motor; an off-on starter switch interconnecting the current source and the first terminal of the coil; the second terminal of the coil being connected to a first of the cam-actuated switch terminals, the second of the cam-actuated switch terminals being connected to the second terminal of the timer motor; the cam being adapted to cause the cam-actuated switch to interconnect the common and first terminals of the cam-actuated switch when the timer is to be started, closing the starter switch actuating the relay to close the relay switches, closing the first relay switch providing a captive circuit for holding the relay actuated, closing the second relay switch providing a connection to ground for the timer motor, and closing the third switch providing a circuit for a device whose operation is to be timed, operation of the timer motor for a predetermined period moving the cam to a position such that the cam-actuated switch assumes its second condition and connects its common and second terminals, thereby disconnecting the second terminal of the coil from ground and opening the captive circuit, opening all relay switches, the cam-actuated switch providing a connection to ground for the timer motor until, upon further operation, the timer motor moves the cam so that the cam-actuated switch assumes its first condition, thereby opening the timer motor's connection to ground and stopping the timer motor until the starter switch is again closed.

2. A timer according to claim 1 in which the third switch is an off-on switch.

3. A timer according to claim 1 in which the third switch is connected to the current source and controls the flow of current therefrom to a device under control of the timer.

4. A timer according to claim 1 in which the relay includes additional switches actuated in unison with the said three switches for simultaneously controlling other circuits.

5. A timer according to claim 1 in which the source provides alternating current, and in which a diode is connected between the first relay switch and the first terminal of the coil.

6. A timer according to claim 5 in which a capacitor is connected between a junction between the diode and first terminal of the coil, and the ground.

7. A timer according to claim 6 in which the current source provides multi-phase alternating current, the timer motor, first relay switch, and starter switch being connected to one phase thereof, there being provided a relay switch for each phase.

8. A repeat cycle timer for controlling a circuit comprising: a current source and a ground; a timer motor, a first terminal of which is connected to the current source; a pair of cams driven by the timer motor; a pair of cam-actuated switches, one engaged to each of said cams and having a pair of switching conditions determined by its respective cam, each said switch including a common terminal connected to said ground and two switch terminals, and being adapted to connect the common terminal to either one of the switch terminals in response to the respective cam position; a first electromagnetic relay including a coil having a pair of terminals, and an off-on-relay switch actuable by the coil, a second electromagnetic relay including a coil having a pair of terminals, and a pair of off-on switches simultaneously actuable by the coil, a first of the relay switches in the second relay interconnecting said current source and one terminal of each of the coils, a second of the relay switches in the second relay interconnecting the first terminal of the first cam-actuated switch and the second terminal of the timer motor to ground; the second terminals of the first and second cam-actuated switch being connected to the coil of the second relay, the common terminals of the first and second cam-actuated switches being connected to ground and to the coil of the first relay, respectively, the cam-actuated switches connecting their common and second terminals when actuated by the respective cams, the two cams providing an initial concurrent period of actuation of both cam-actuated switches, then a period of actuation of the first and deactuation of the second cam-actuated switches, then a concurrent period of deactuation of both cam-actuated switches, followed by the first-described period of actuation of both cam-actuated switches; an off-on starter switch interconnecting the current source and both of the coils; and a condition-responsive switch connected between the coils of the relays, closing the starter switch, actuating the relays to close the relay switches, closing the second relay providing a captive circuit for holding the relay actuated, and providing a connection to ground for the timer motor, and closing the second relay providing a circuit for a device whose operation is to be timed, operation of the timer motor for a predetermined period moving the second cam associated with the second cam-actuated switch to a position such that the second cam-actuated switch connects its common and first terminals, thereby disconnecting the coil of the second relay from ground and opening its switches unless the condition-responsive switch is closed, further rotation of the first cam connecting the common and first terminals of the first cam-actuated switch, thereby providing a connection to ground for the timer motor while opening the circuit through the coil of the second relay until, upon further operation, the timer motor moves both cams so that the cam-actuated switches connect their common and second terminals, thereby opening the timer motor's connection to ground and stopping the timer motor until the starter switch is again closed.

9. A timer according to claim 8 in which the switch in the first relay is connected to the current source, and controls the flow of current therefrom to a device under control of the timer.

10. A timer according to claim 8 in which the first relay includes additional switches actuated in unison with said switch for simultaneously controlling other circuits.

11. A timer according to claim 8 in which the source provides alternating current, and in which a diode is connected between the first switch of the second relay and a terminal of its coil.

12. A timer according to claim 11 in which a capacitor is connected between a junction between the diode and said terminal of the coil of the second relay, and the ground.

13. A timer according to claim 12 in which the current source provides multi-phase alternating current, the timer motor, second relay switch, and starter switch being connected to one phase thereof, there being provided a switch in the first relay for each phase.

No references cited.